(12) United States Patent
Rippy et al.

(10) Patent No.: US 8,882,594 B2
(45) Date of Patent: Nov. 11, 2014

(54) CONTROL SCHEME FOR REAL TIME STRATEGY GAME

(75) Inventors: Christopher J. Rippy, Allen, TX (US);
Timothy A. Deen, Dallas, TX (US);
Angelo J. Laudon, Allen, TX (US);
Graeme Devine, Rockwall, TX (US)

(73) Assignee: Microsoft Corporation, Redmond, WA (US)

(*) Notice: Subject to any disclaimer, the term of this patent is extended or adjusted under 35 U.S.C. 154(b) by 1664 days.

(21) Appl. No.: 11/697,048

(22) Filed: Apr. 5, 2007

(65) Prior Publication Data
US 2008/0248848 A1 Oct. 9, 2008

(51) Int. Cl.
*A63F 9/24* (2006.01)
*A63F 13/40* (2014.01)

(52) U.S. Cl.
CPC .............. *A63F 13/10* (2013.01); *A63F 2300/66* (2013.01)
USPC ...................... 463/33; 463/9; 463/31; 463/32

(58) Field of Classification Search
CPC ... A63F 13/00; A63F 13/10; A63F 2300/306; A63F 2300/65; A63F 2300/66; A63F 2300/807; G07F 17/32; G07F 17/3202; G07F 17/3209; G07F 17/322; G07F 17/3244; G07F 17/3248; G07F 17/3286; G07F 17/34
USPC ................. 463/30–38; 345/156–157
See application file for complete search history.

(56) References Cited

U.S. PATENT DOCUMENTS

| | | | |
|---|---|---|---|
| 6,025,846 A * | 2/2000 | Chudley | 345/419 |
| 6,126,547 A * | 10/2000 | Ishimoto | 463/42 |
| 6,241,609 B1 * | 6/2001 | Rutgers | 463/31 |
| 6,659,870 B2 | 12/2003 | Sobota | |
| 6,717,569 B1 | 4/2004 | Gruhl et al. | |
| 6,966,837 B1 | 11/2005 | Best | |
| 2002/0054018 A1 * | 5/2002 | Yamaguchi | 345/157 |
| 2004/0157662 A1 * | 8/2004 | Tsuchiya | 463/32 |
| 2004/0176164 A1 * | 9/2004 | Kobayashi | 463/30 |
| 2006/0009270 A1 | 1/2006 | Kobayashi et al. | |
| 2006/0040740 A1 | 2/2006 | DiDato | |
| 2006/0135256 A1 * | 6/2006 | Toyama | 463/31 |
| 2006/0148564 A1 | 7/2006 | Herkelman | |
| 2006/0246974 A1 * | 11/2006 | Tsuda et al. | 463/7 |
| 2006/0287027 A1 | 12/2006 | Hardisty et al. | |
| 2007/0010325 A1 | 1/2007 | Suzuki et al. | |
| 2007/0164989 A1 * | 7/2007 | Rochford et al. | 345/156 |

OTHER PUBLICATIONS

"Confict: Desert Storm," © 2002 SCi Games Ltd., pp. 1-32.*
Keith Phillips and Wayne Piekarski, Possession techniques for interaction in real-time strategy augmented reality games, ACM International Conference Proceeding Series , Proceedings of the 2005 ACM SIGCHI International Conference on Advances in computer entertainment technology, 2005.
Alastair H. Cummings, The Evolution of Game Controllers and Control Schemes and their Effect on their games, University of Southampton, 2007.

* cited by examiner

*Primary Examiner* — Steve Rowland
(74) *Attorney, Agent, or Firm* — Aaron Chatterjee; Kate Drakos; Micky Minhas

(57) ABSTRACT

A control scheme for a real time strategy game using a game controller includes maintaining a cursor in a known, fixed position of the monitor in a manner so that it appears the game space if moving behind a cursor even during changing viewing positions such as tilting movements. The control scheme further includes other aspects including a technique for selecting units using the game controller and interacting with menus using the game controller.

20 Claims, 8 Drawing Sheets

CONTROL SCHEME FOR REAL TIME STRATEGY GAME

BACKGROUND

The discussion below is merely provided for general background information and is not intended to be used as an aid in determining the scope of the claimed subject matter.

A well-known genre of computer-based games is real-time strategy (RTS) games. This genre of games is characterized by being a wargame, which takes place in real-time. Players exhibit characteristics of generals or supreme commanders overseeing a battlefield and/or other areas of the game space. Besides instructing units (e.g. tanks, helicopters, soldiers, etc.) where to go and who to fight, each player usually must also control infrastructure or resources in order to build and/or maintain the units. This aspect of strategy involves economic and production tactics, which is just as important, if not more important, than the military tactics each player employs.

Real-time strategy games do not involve players taking turns, but rather, the game proceeds in "real time" or continuously, where any player may give "orders" to units at any time. Usually, there is little down time for each player. Players are kept very busy. In order to defeat other player(s) with similar resources, each player is constantly switching attention between all aspects of the game such as the factories and bases producing or housing units not engaged in action, and the various units headed to or currently in action engaging another player's units. This requires each player to manipulate a user input device in combination with the game's user interface screens in order to move throughout the game space, select units and provide orders. When such games are played on a computer a user usually uses a point and click input device, typically a mouse, which allows the user to select units and work with game user interfaces in a relatively easy, intuitive manner. However, playing a real-time strategy game on a game console using a game controller is more difficult, particularly when success usually requires quick movement through the game space, easy selection of units and/or easy interaction with game user interfaces.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

Real-time strategy games, as used herein, are computer games characterized by being wargames which take place in real-time, where resource gathering, base building and/or unit development and direct control over individual units are key components. A first aspect of a control scheme for a real time strategy game using a game controller includes maintaining a cursor in a known, fixed position of the monitor in a manner so that it appears the game space is moving behind a cursor even during changing viewing positions such as tilting movements. The views can be continuous such as scrolling from one portion of the game space to another, or the views can occur in jumps initiated by either the desire to return to base, find a particular type of game unit or investigate an event such as the start of a new fight to name just a few. By maintaining the cursor in the known position throughout the views, the user can easily, but more importantly, quickly select a unit during game play.

The control scheme further includes other aspects including a technique for selecting units using the game controller. One particularly advantageous method includes switching among different types of units that are currently being displayed to the user. This method involves rendering the view having different types of units. The first time a designated button on the controller is activated, a first type of unit currently being displayed is selected. Then, when the user activates the button again, another type of unit is then selected. This process can continue throughout all the types of units currently being displayed with each activation of the button, where the first type of unit is again selected after cycling through some or all of the available units being displayed.

The control scheme also includes interacting with menus using the game controller. In real time strategy games, this has been difficult, particularly when prior games have tried to have the controller emulate a pointing device such as a mouse. Instead, the user interface menu system is characterized by displaying a menu and "locking" the cursor within the menu until an exit button on the controller and/or option on the menu is selected.

DETAILED DESCRIPTION

Figure 1:
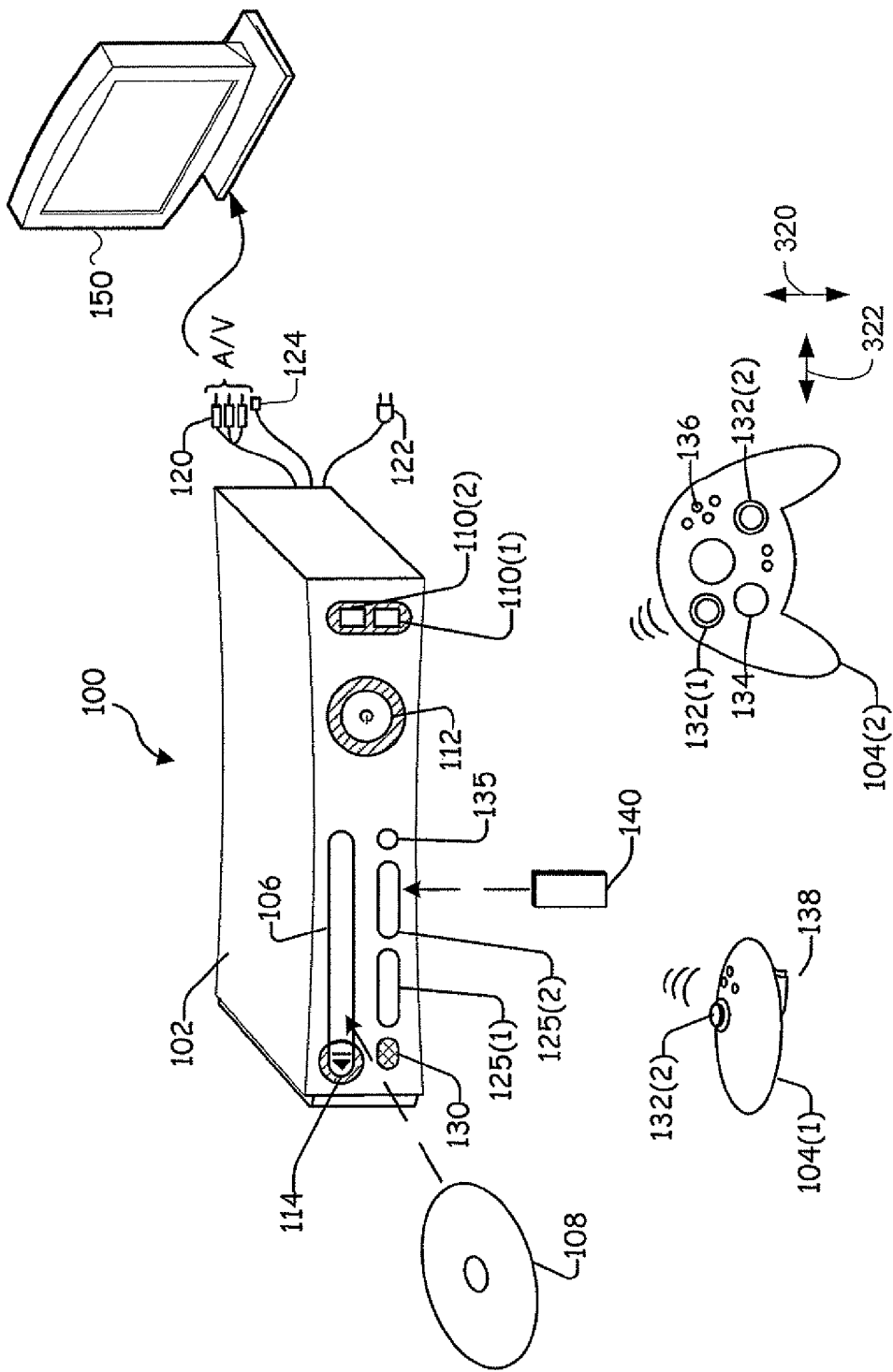
FIG. 1 is an isometric view of an exemplary gaming and media system.

FIG. 1 shows an exemplary gaming and media system 100. The following discussion of FIG. 1 is intended to provide a brief, general description of a suitable environment in which concepts presented herein may be implemented. As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that supports various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (150) via A/V interfacing cables 120. In one implementation, console 102 is equipped with a dedicated A/V port (not shown) configured for contents secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers are USB-compatible and are coupled to console 102 via a wireless or USE port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation (not shown), a memory unit (MU) 140 may also be inserted into console 100 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from optical disk media (e.g., 108), from an online source, or from MU 140. A sample of the types of media that gaming and media system 100 is capable of playing include:

Game titles played from CD and DVD discs, from the hard disk drive, or from an online source.

Digital audio/video played from a DVD disc in portable media drive 106, from a file on the hard disk drive (e.g., Active Streaming Format), or from online streaming sources.

During operation, console 102 is configured to receive input from controllers 104 and display information on display 150. For example, console 102 can display a user interface on display 150 to allow a user to select and play a real-time strategy game using controller 104 as discussed below.

Figure 2:
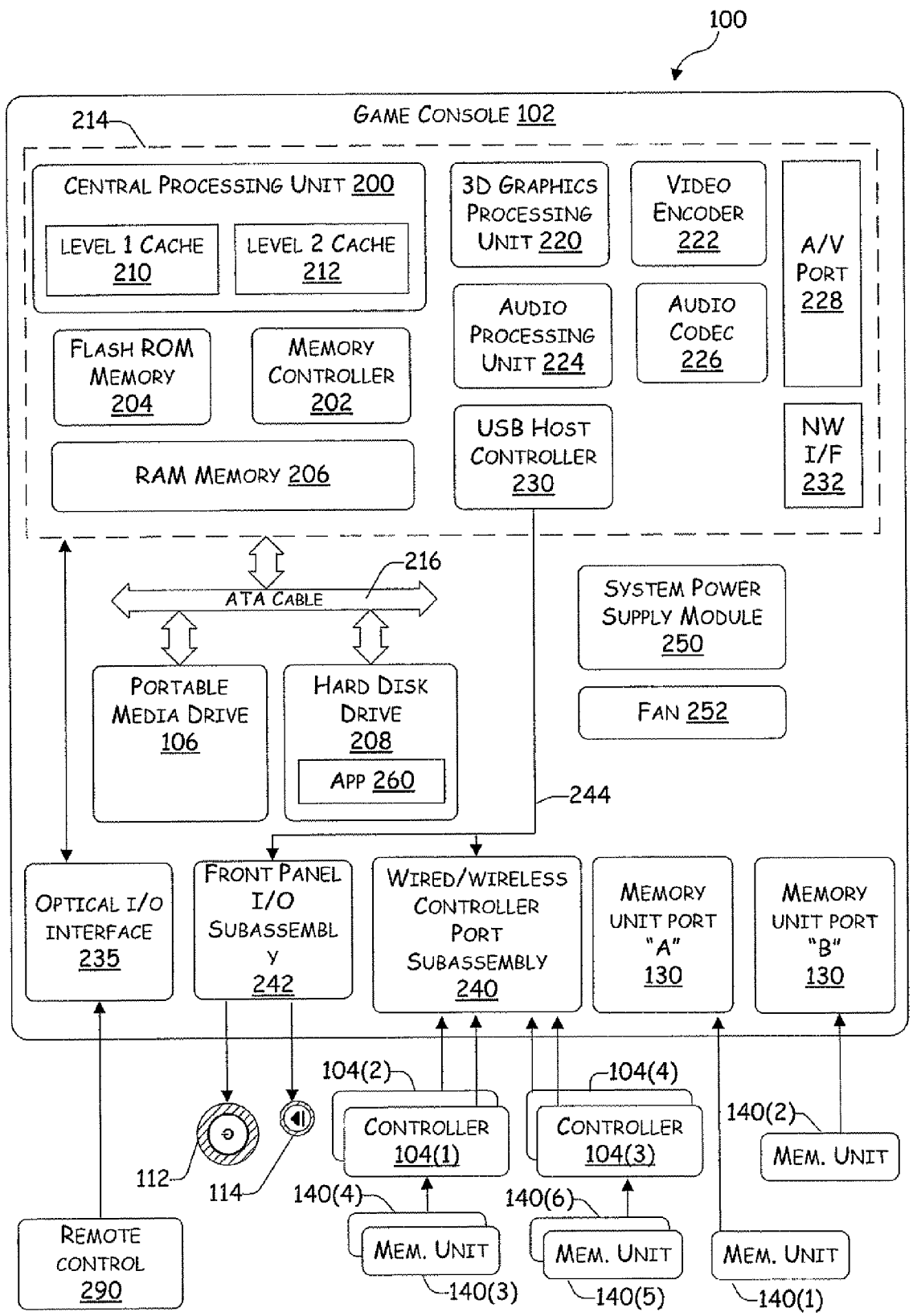
FIG. 2 is an exemplary functional block diagram of components of the gaming and media system shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210, and a level 2 cache 212 to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a Peripheral Component Interconnect (PCI) bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown) The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals from a remote control 290 that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202.

A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games. However, with the integration of broadband connectivity made available through network interface 232, gaming and media system 100 may further be operated as a participant in a larger network gaming community, depending on the type of game being played.

Figure 3:
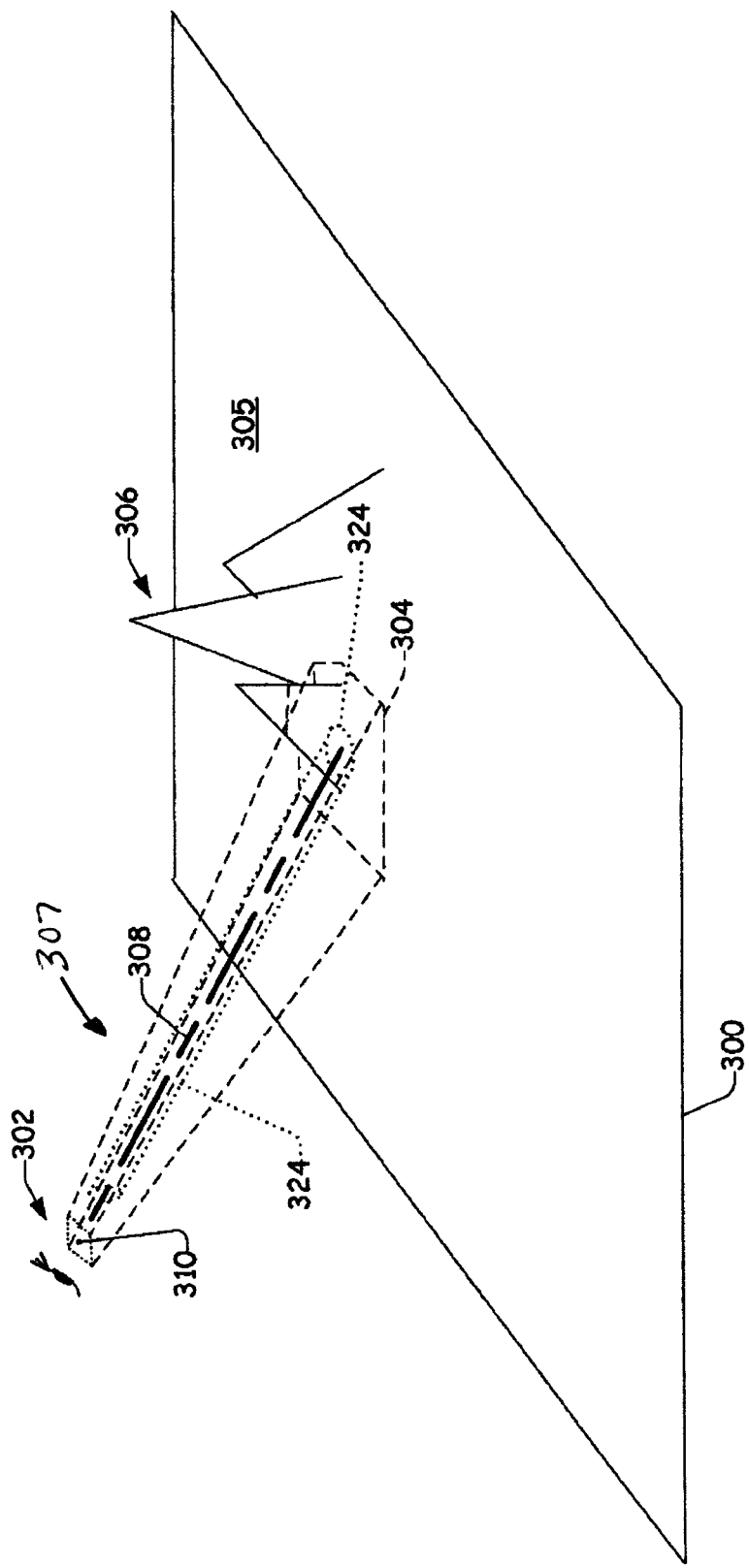
FIG. 3 is pictorial representation of a game space.

One aspect herein described involves movement of the user's view within the game space. In order to effectively direct units and/or resources, a user can not view the complete game space at all times. Rather, as is commonly done, the user is given a partial view of the game space, typically substantially spaced apart from at least some of the units in the game space, for example from overhead; however, the user has many options regarding this view. Besides selecting which portion of the game space will be viewed, the user is commonly allowed to vary the resolution or the extent of the portion of the game space that is being viewed as well as his/her perspective of the game space, in other words the angle or "tilt" of the view relative to units in the game space. This is illustrated schematically in FIG. 3, where the game space is generally indicated at 300 and the user's position 302 relative to the game space 300 is indicated by an eye. The user's position 302 can be represented in a three-dimensional coordinate system relative to the game space 300. Furthermore, the user's view at that position can be represented by a three-dimensional coordinate system; thus, allowing the perspective of the user's view to be much more complex than just looking straight down upon units in the game space 300. In the illustrative example, the game space 300 includes a terrain 305 upon which some of the units can be located. In FIG. 3, the user's view from position 302 in the game space 300 can be represented as the perimeter of shape 304 as projected within, for example, upon the terrain 305 of the game space 300. The irregular nature of the perimeter of shape 304 is provided to represent that the terrain 305 of game space 300 can be in three dimensions as well, herein represented by mountains 306. At this point it should be noted that view rendered are those objects that are in or partially within a frustum 307 coinciding with the perimeter of shape 304 and converging at the user's viewing position 302.

This complex manner in which the user's view of the game space 300 can take is well known in real time strategy games. Furthermore, the specific manner in which the views are generated for the user based on user's position 302 and view with respect to the game space 300 are not necessary for understanding aspects herein described since this can be implemented in many different ways depending upon how the user's position 302, orientation of view and the positions of units in the game space 300 are maintained.

Figure 4:
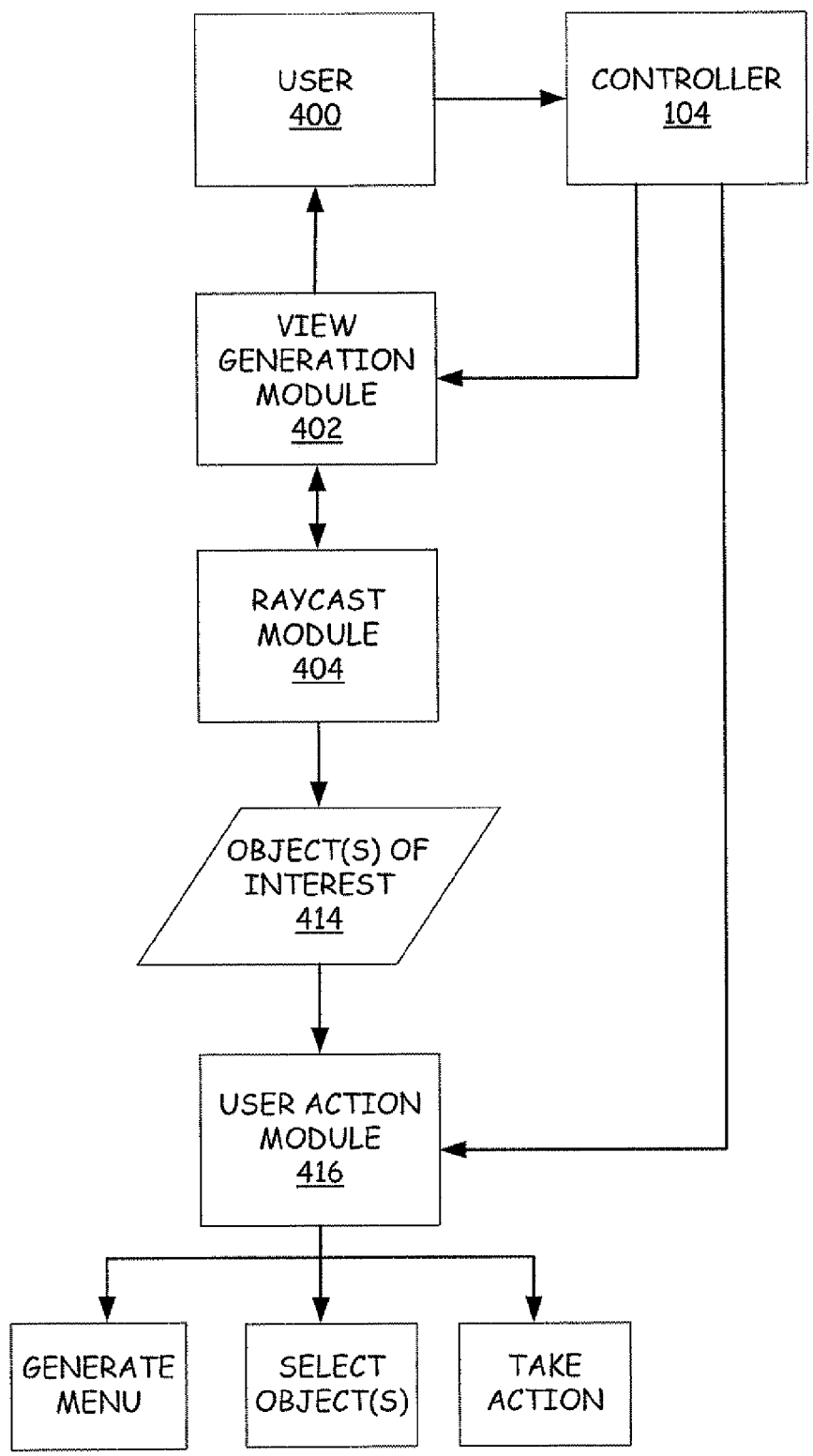
FIG. 4 is a flow diagram of operation of a real time strategy game.

With this understanding, FIG. 4 depicts in block diagram form one manner in which real time strategy can be implemented. Generally, user 400 receives through monitor 150 views generated by a view generation module 402 that generates views based on the user's position 302 and orientation of view into the game space 300. The user manipulates input buttons 136,138, d-pad 134 and thumbsticks 132(1), 132(2) of game controller 104 to provide input into the view generation module 402 to change his/her view as well as select objects. In the implementation illustrated, a virtual "ray" 308 (FIG. 3) is determined from the user's position and orientation down into the game space 300. The location of the "ray" relative to the rendered view provided to the user on the monitor 150 is maintained in a fixed position with respect to an edge of the rendered view, for example, in the center of view as rendered on the monitor 150. In FIG. 3, this is represented by element 310. Generation of the "ray" 308 is provided by raycast module 404. The ray 308 represents a projection into the game space 300, i.e. the point (two-dimensional) or line (three dimensional) of interest of the user in the game space 300. More importantly, through use of the "ray" 308; the user can identify one or more objects of interest represented at 414. The object or objects of interest 414, for example, can be one or units, or simply a location in the game space 300, which herein can also be considered an "object".

Information pertaining to object or objects of interest 414 can be provided to a user action module 416. User action module 414 can receive further input from the user through controller 104. In other words, manipulation of the controller 104 by the user 400 not only affects the view rendered by the user, but also other actions that can be taken during game play. One common action that can be taken is simply selecting one or more objects from the objects of interest 414. Without limitation, some other actions include initiating a menu or taking an action. With respect to initiating a menu, the menu can pertain to the object(s) of interest or selected. For instance, a menu could be brought up providing information of a resource such as a factory. The menu may or may not be adapted to receive further input from the user. With respect to an action, the action could include instructing the object(s) selected to perform an act such as capture or attack another unit, or performing some other form of action on the object(s) of interest.

One particular advantageous aspect of the real time strategy game system described herein is how perceived movement is made in the game space 300 and how this movement is rendered to the user. As indicated above, the location of the "ray" 308 relative to the rendered view provided to the user on the monitor is maintained in a fixed position, for example, in the center of view as rendered on the monitor 150. With respect to shape 304 as projected upon the terrain 305 of the game space 300, the ray 308 coincides with the center of shape 304 although given the three-dimensional configuration of the terrain 305 and the user's viewing position 302, the position of the ray 308 may not appear in the center of shape 304. Nevertheless, there is a known relationship between a cursor as rendered to the user on the monitor 150 and the ray 308. In one embodiment, the cursor coincides with the ray 308, and since the ray 308 is maintained in a fixed relation with the rendered view, the cursor is maintained in a fixed relation with the rendered view. In a one particular embodiment, the ray 308 and the cursor are maintained in the center of the rendered view even when the view of the game space 300 changes. Unlike some real time strategy games that attempt to emulate a pointing device such as a mouse, where movement of the view in the game space 300 is initiated when the cursor is moved to the edge of the rendered view, in this embodiment, manipulation of the controller 104 to cause movement in the game space 300 causes the game space 300 to appear to move under a stationary cursor. This has been discovered to be an easy manner in which to move around the game space 300 when using game controller 104 and where the orientation (i.e. tilt) of the view of the game space 300 can change in addition to the position of the user's view 302 in the game space 300.

Figure 5:
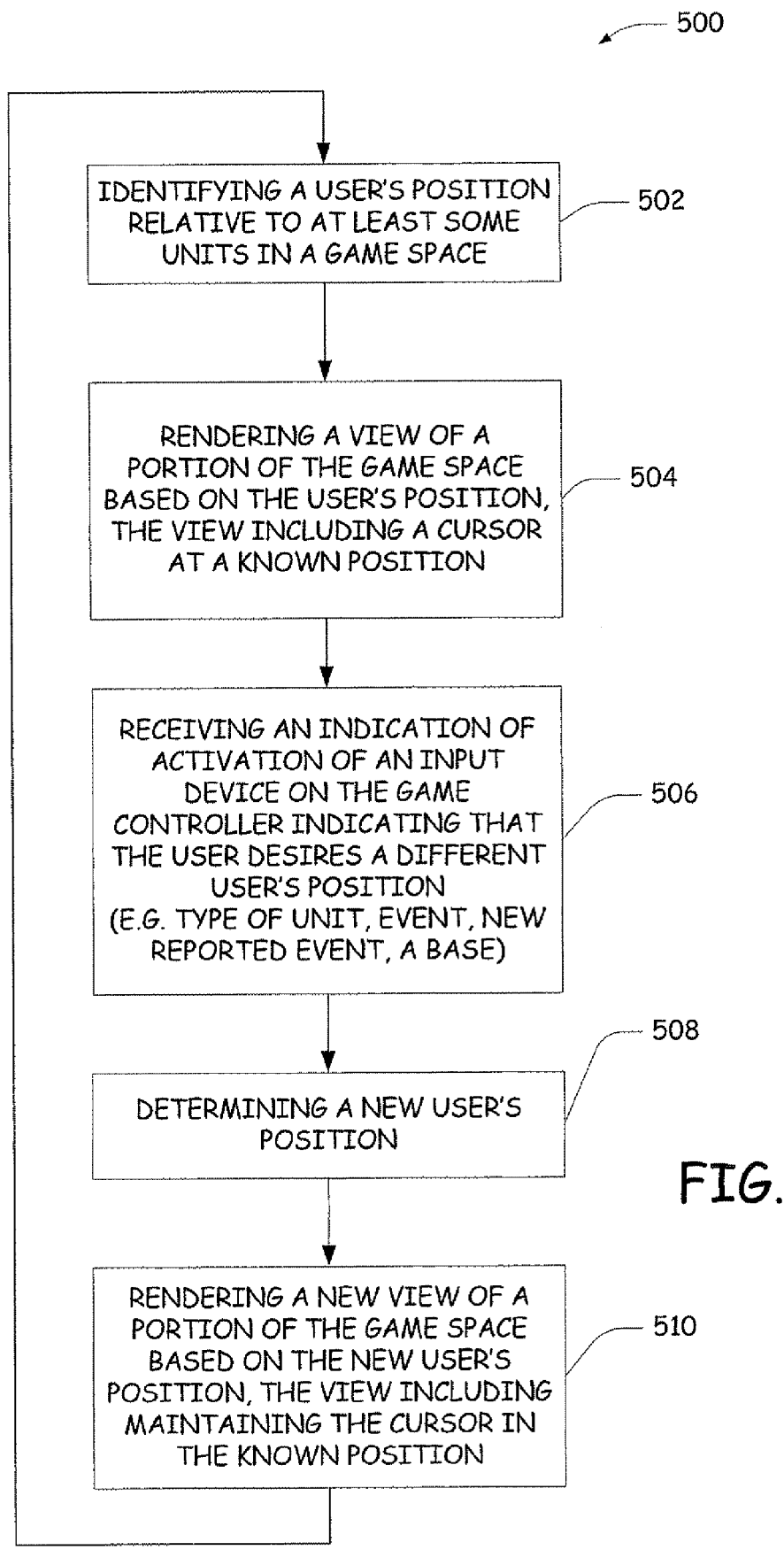
FIG. 5 is a flow diagram for obtaining a new viewing position for the user in the game space.

A method 500 illustrated in FIG. 5 summarizes how new viewing positions for the user are obtained. At step 502, the user's position relative to at least some units in a game space 300 is identified. The position is spaced apart from the units and has a parameter indicative of a selected tilt with respect to the units. At step 504, a view of a portion of the game space 300 based on the user's position 302 is rendered. The view includes the cursor used for selecting one or more units, the cursor being at a known position relative to an edge of the rendered view. At step 506, an indication of activation of an input device such as a button or thumbstick 132 on the game controller 104 indicating that the user desires a different user's position is received. A new user's position is determined at step 508. For at least some if not all of the execution of the game, a new view of a portion of the game space 300 based on the new user's position is rendered at step 510. The new view has maintained the cursor in the known position relative to the edge of the rendered view. This method is repeated for any type of movement such as scrolling and jumping as described further below.

With respect to the user manipulated devices on game controller 104, thumbstick 132(1) (which is a two-dimensional input device in other words an output therefrom can be considered as having two dimensions) controls the position of the user's viewing position 302 in approximately a plane, for instance, at a given altitude above the game space 300. Thumbstick 132(2) (also again another two-dimensional input device) is used to control other aspects of the position or orientation user's viewing position 302. In one mode of operation, the thumbstick 132(2) controls the manner of tilt of the user's viewing position 302 with respect to the game space 300. Since the virtual ray 308 extends from the user's viewing position 302 and the ray 308 is maintained in a fixed position of the rendered view (e.g. the center), movement of thumbstick 132(2) coincides with tilting of the virtual ray 308 with respect to the game space in two degrees of freedom, (akin to pivoting a rod with one end fixed to a surface). In a second mode of operation, thumbstick 132(2) is used to control the altitude of the user's viewing position 302 by movement of the thumbstick 132(2) in a direction indicated by double arrow 320, while movement of the thumbstick 132(2) in a direction indicated by double arrow 322 causes either clockwise or counterclockwise rotation of the user's viewing position, or in other words about the virtual ray 308. Selection of the desired mode for thumbstick 132(2) is controlled the righthand switch 138, wherein one of the modes is selected when the switch is activated (depressed by the user) and the other when it is not activated (not depressed by the user).

Constantly during playing of the real time strategy, the user needs to select one or more units to provide instructions to. If it just one unit that the user wants to select, the user moves the user's position throughout the game space 300, until the desired unit is under the cursor (also sometimes called a "reticule"), which as stated above can be maintained in a fixed position such as in the center of the monitor 150. Once the desired unit coincides with the cursor, the user activates a button such as one of the buttons 136.

In a further embodiment, the user can select a group of units using a user defined selection space 324 in the game space 300. The selection space 324 can be any shape; however, in one embodiment, the selection space 324 is in the shape of a cylinder or frustum cone that grows radially outward from the ray 308 with continued activation of a button such as one of the buttons 136, which can be the same button referred to above used to select one unit. The size of the selection shape 324 can be monitored by a shape such as a circle 326 projected on the terrain. Any unit is a unit that will be deemed selected by the user, if it (or part thereof, if desired) falls within the selection space 324. As is known, each unit has a corresponding "bounding box" whereupon a portion such as a corner falls within the selection space 324 it will be selected. In some instances, different types of units will be selected. If desired, a selection list can be updated to reflect each of the units or types of units. The user can process the selection list, providing instructions to each unit or types of units as desired. Use of a three-dimensional selection space 324 is advantageous when units can be above the terrain, such as helicopters. If such units are not present a two-dimensional space on the terrain 305 can be used.

Figure 6:
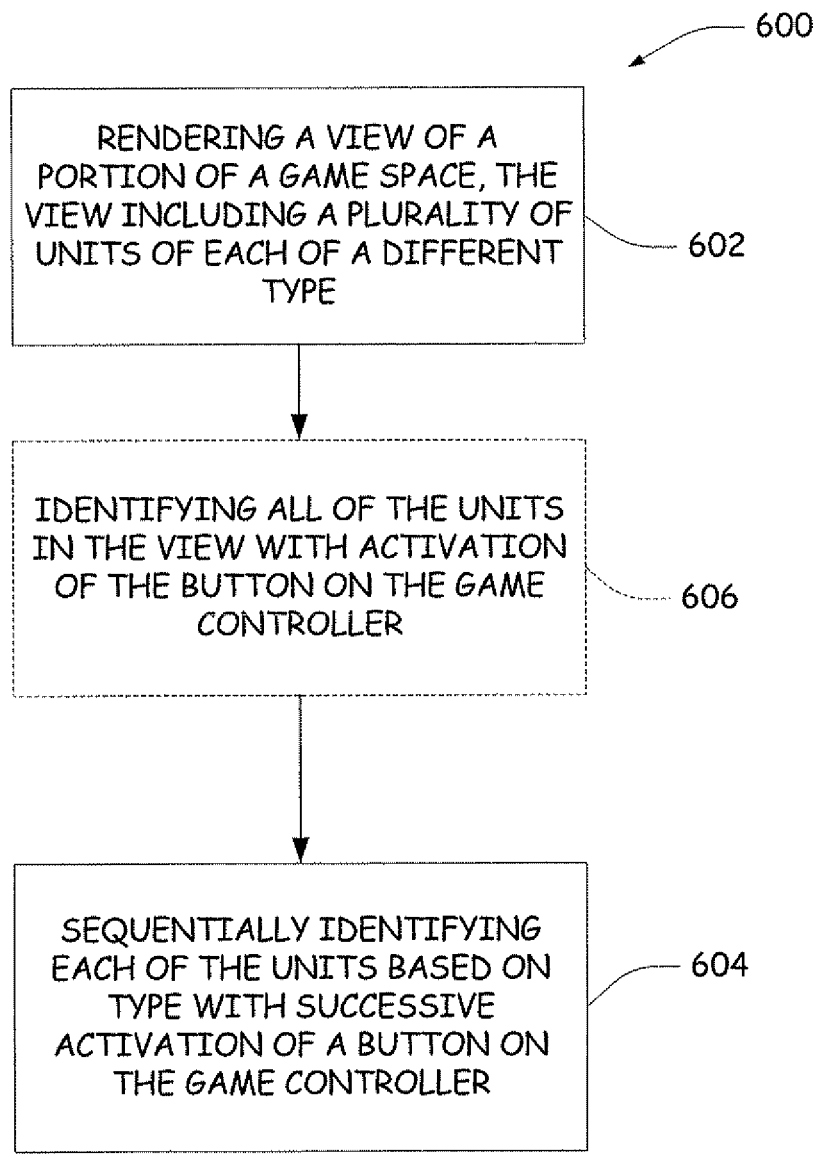
FIG. 6 is a flow diagram for selecting units.

In another manner of selecting units, the user can switch between different types of units that have been identified. For instance, one of the buttons 136 can be used to switch among different types of units that are currently being displayed to the user. In one manner as illustrated by method 600 in FIG. 6, this method involves rendering the view having different types of units at step 602. At step 604, the first time the button is activated, a first type of unit currently being displayed is selected. Then, when the user activates the button again, another type of unit is then selected. This process can continue throughout all the types of units currently being displayed with each activation of the button, where the first type of unit is again selected after cycling through some or all of the available units being displayed. In a further embodiment, if desired, the initial activation of the button could select all of the units regardless of type as indicated at step 606. Then, the second activation of the button starts the cycling process of selection of different types of units as described above.

Another particularly advantageous manner in selecting, or at least finding, a unit or a group of units of the same type (groups of which can be user configurable) also allows the user to move quickly within the game space 300. This is accomplished for instance by using a designated button on the controller 104 and repeated actuation of the button. In operation, suppose the user is viewing one portion of the game space 300, but then desires to quickly move to any army of soldiers somewhere else in the game space 300. Rather than scrolling throughout the game space 300, the user activates a designated button on the controller 104 and the game moves the users viewing window to a window that shows the army of soldiers, for instance, in such a manner so as to coincide with the cursor allowing easy subsequent selection, if desired. If the user has more than one army in the game space 300, a subsequent activation of the designated button again moves the users viewing window to a window that shows the second army of soldiers, possibly in such a manner so as to coincide with the cursor allowing easy subsequent selection. Repeated activation of the designated button causes the viewing window and army displayed therein to cycle through some or all of the armies available in the game space 300. Different buttons can be used for different units or groups of units of the same type in the same manner as described above with respect to armies.

In yet another embodiment, button(s) can be used to designate other "events" that may be of interest to the user. For instance, a button can be used to allow the user to jump to a battle being fought regardless of the type of units in the battle. Again, repeated activation of the button will allow the user to cycle through some or all of the events of interest. It should be noted an event of interest need not be all of the same type such as current battles being fought. Rather, the events of interest may change dynamically during play of the game. For instance, the system may inform the user that a new fight has just started, whereupon activation of the button, takes the user to the location of the new fight. As another example, the system may then inform the user that a new tank is now available, in which case activation of the button will take the user to the location of the new tank.

One particularly advantageous button assembly to use is the d-pad button assembly 134. As is commonly known, the d-pad button assembly 134 is a rocker button assembly having a suitably shaped button such as disc that can be slightly tilted in effect activating or appearing to activate different switches in fixed positions such as the "12-O'clock, 3-O'clock, 6-O'clock and 9-O'clock" positions. By also merely pushing the d-pad button assembly straight down, another different switch activation is realized. Each of the different activations of the d-pad 134 can be used to designate a different type of unit or event of interest. Besides those described above, one of the buttons can be used to jump to a view of a base as illustrated at step 506. The designations of the buttons such as the various positions of the d-pad can be preselected, but if desired a suitable interface can allow the user to change the designations as desired.

Figure 7:
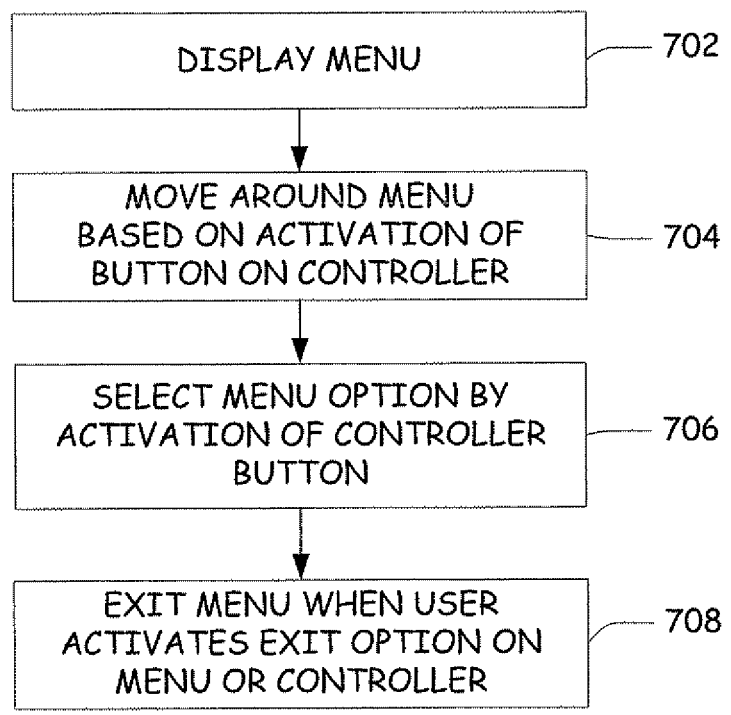
FIG. 7 is a flow diagram for interacting with a menu in real time strategy game.
Figure 8:
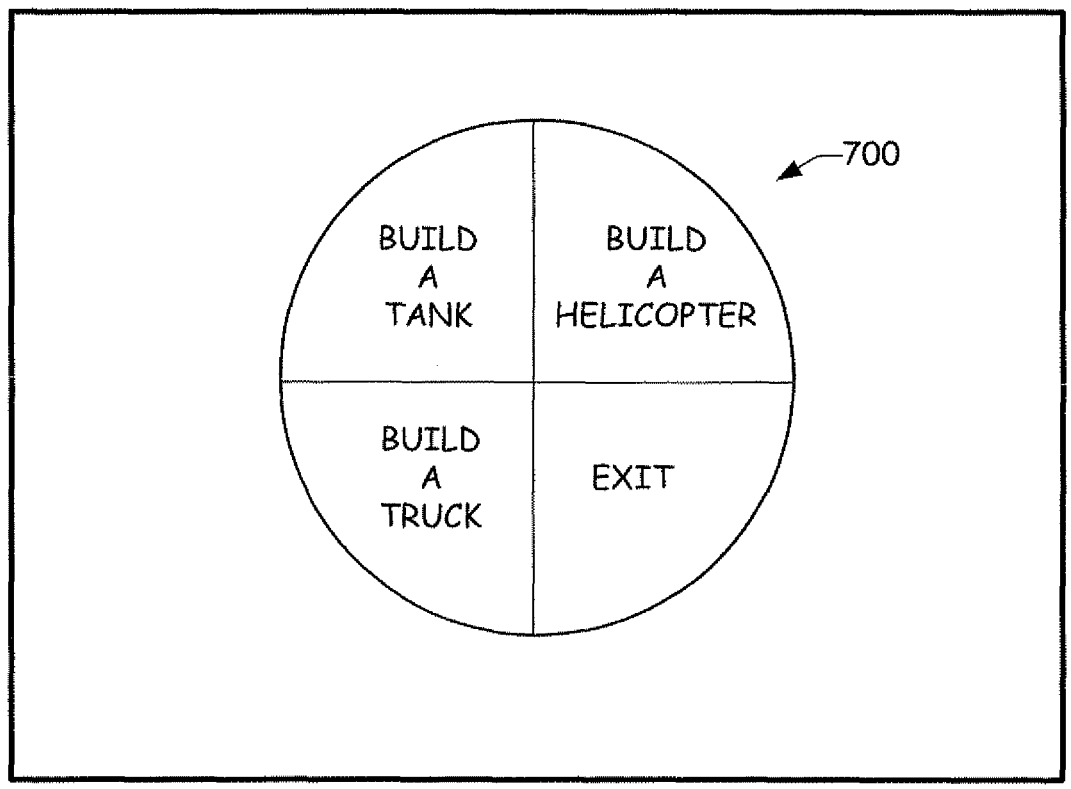
FIG. 8 is a pictorial representation of a menu.

In addition to moving around in the game space 300 and selecting units, the user may occasionally need to bring up a menu and make some selections within the menu. In real time strategy games, this has been difficult, particularly when prior games have tried to have the controller 104 emulate a pointing device such as a mouse. Referring to FIG. 8, a menu system for a real time strategy game with operation by a game controller is provided. Referring also to FIG. 7, the user interface menu system is characterized by displaying a menu 700 (step 702) and "locking" the cursor within the menu 700 until an exit button or option is selected (step 708). Within the menu 700, the user can choose among different options by moving around the menu 700 (step 704) using a designated button on the controller 104 and make selections (step 706), for example, using another button on the controller 104. FIG. 8 illustrates the exemplary menu 700 that includes four options related to a factory of a real time strategy game. Other aspects of the game would have other menus. By way of example, when the factory is selected, menu 700 is displayed. Once displayed, one of the options such as "build a tank" can be highlighted. If the user would like a tank built, the user can activate a designated button on the controller 104, where multiple activations will cause multiple tanks to be built. As desired, the user can move throughout the menu 700 in order to perform other actions such as "build a helicopter", "build a truck", etc. Once all desired actions have been selected, the user can activate a designated button on the controller 104 and/or select a designated option on the menu 700 such as "Exit" to exit from the menu 700. Organization of the menu options in the form of a circle or circular shape, where movement within the menu (i.e. options are identified) is in circular order either clockwise and/or counterclockwise is particularly easy for the user to understand, and thus, predict how many operations of the button are necessary to obtain the desired option.

Displaying and interfacing with menus in a manner described above is easy to understand, and more importantly, is easy to perform, because in real time strategy games the user must be able to access, manipulate and exit menus quickly with the game controller 104.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A system comprising:
    a processor;
    an input device;
    a rendering device; and
    a computer readable storage medium having instructions accessible by the processor and which when executed on the processor conduct a real time strategy game based on user input from the input device, the instructions comprising:
        operating a plurality of units in a game space, wherein operating includes selectively providing instructions to each of the plurality of units in the game space, each of the units having a unit type and taking action in the game space based on each corresponding instruction;
        identifying a user's position in the game space, the position being spaced apart from the units and having a parameter indicative of a first tilt with respect to the units;
        rendering a first view of a portion of the game space on the rendering device based on the user's position, the first view having the first tilt and including a cursor used for selecting one or more units;
        selecting a set of the units to which a corresponding instruction will be provided in the first view;
        reporting to the user that an event has occurred, the event comprising a first that has occurred in the game;
        receiving an indication of activation of the input device indicating that the user desires a different user's position;
        determining a new user's position, with the processor, that is spaced apart from the units and has a parameter indicative of a second tilt with respect to the units that is different than the first tilt, wherein the new user's position corresponds to the event that has occurred in the game; and
        for at least some of the execution of the game, rendering a new view of a portion of the game space based on the new user's position, the new view having the second tilt.

2. The system of claim 1 wherein receiving the indication, determining the new user's position and rendering the new view is repeated sequentially so as to appear that the game space is scrolling by from the first tilt to the second tilt, and wherein with each new view the cursor is maintained in a same known position relative to the edge of the rendered view.

3. The system of claim 1, wherein the input device comprises a user activated button, and wherein the plurality of units comprise a plurality of different unit types and successive activation of the user activated button selects a different set of the units based on the unit types, wherein the set of units comprise units of a first unit type, and the different set of units comprise units of a second, different unit type.

4. The system of claim 2 wherein the new user's position comprises a position of the game space spaced apart sufficiently from the game space of the first view such that rendering of one of said each new view does not contain any portion of the game space from the first view.

5. The system of claim 1, wherein receiving an indication of activation of the input device indicating that the user desires a different user's position comprises:
receiving an indication that the user desires to be taken to a location of the event, wherein the new user's position is determined based on the location of the event.

6. The system of claim 1 wherein receiving the indication, determining the new user's position and rendering the new view is repeated sequentially so as to render different events of the same type.

7. The system of claim 1 wherein the new user's position corresponds to a selected type of unit in the game space.

8. The system of claim 7 wherein receiving the indication, determining the new user's position and rendering the new view is repeated sequentially so as to render different units of the same type.

9. The system of claim 8 wherein the input device comprises a button, and the instructions further comprise receiving an indication of activation of the button indicating that the user desires a different user's position; and wherein determining the new user's position is based on activation of the button; and wherein receiving the indication, determining the new user's position and rendering the new view is repeated sequentially so as to render different events of the same type.

10. The system of claim 9 wherein the input device comprises a second button and the instructions further comprise receiving an indication of activation of the second button indicating that the user desires a different user's position; wherein determining the new user's position is based on activation of the second button; and wherein the new user's position corresponds to a view of a base.

11. The system of claim 10 wherein the input device comprises a d-pad button assembly, the d-pad button assembly being used for the button and the second button.

12. The system of claim 1 wherein the input device comprises a two-dimensional input device operable by the user configured to indicate a new user's position comprising a change in tilt, the system having a second input device comprising a two-dimensional input device operable by the user configured to indicate a new user's position comprising a change in position other than a change in tilt.

13. A computer-implemented method of conducting a real time strategy game based on user input from an input device, the method comprising:
operating a plurality of units in a game space using a computer processor, wherein the game space comprises a terrain, wherein operating includes selectively providing instructions to each of the plurality of units in the game space, each of the units taking action in the game space based on each corresponding instruction;
rendering a view of a portion of a game space, the view simultaneously showing a terrain and a set of the units that comprises some but not all of the plurality of units, wherein the set of units comprises a first unit of a first type that is visually shown on the terrain and a second unit of a second type that is visually shown over the terrain; and
while the view is rendered with said first unit being of the first type visually shown on the terrain and second unit of the second type visually shown over the terrain, receiving activation of the input device and, in response, sequentially visually identifying units in the view based on whether the units are of the first type or the second type.

14. The method of claim 13 and further comprising identifying all of the units in the view with activation of the input device.

15. The method of claim 13 wherein the input device comprises a two-dimensional input device operable by the user configured to indicate a new user's position comprising a change in tilt, the system having a second input device comprising a two-dimensional input device operable by the user configured to indicate a new user's position comprising a change in position other than a change in tilt.

16. The method of claim 13, further comprising selecting a first plurality units in a view using a cursor based on a positional relationship of the first plurality of units to the cursor in the view, wherein the cursor maintains a same position with respect to an edge of the view being rendered for each view that is rendered.

17. The method of claim 16 wherein the positional relationship of the first plurality of units to the cursor defines a three dimensional shape in the game space.

18. A system comprising:
a processor;
an input device having a user activated button;
a rendering device; and
a computer readable storage medium having instructions accessible by the processor and which when executed on the processor conduct a real time strategy game based on user input from the input device, the instructions comprising:
operating a plurality of units of a plurality of different unit types in a game space, each of the units taking action in the game space based on corresponding instructions;
determining a first user position relative to at least some units in the game space, the first user position being spaced apart from the units and having a parameter indicative of a first tilt with respect to the units;
rendering a first view of a portion of the game space on the rendering device based on the first user position, the first view not corresponding to a view as seen by any of the units in the game space, the first view having the first tilt and including a cursor for selecting a unit, the cursor being at a known position relative to an edge of the rendered first view;
receiving an indication of activation of the input device and, in response, identifying a set of the units based on the unit types;
determining a second user position, with the processor, based on the identified set of the units, the second user position being spaced apart from the units and having a parameter indicative of a second tilt with respect to the units that is different than the first tilt; and
for at least some of the execution of the game, rendering a second view of a portion of the game space based on the second user position, the second view having the second tilt and showing the identified set of units, while maintaining the cursor in the known position relative to the edge of the rendered view, the second view not corresponding to a view as seen by any of the units in the game space.

19. The system of claim 18, wherein rendering the second view comprises:
switching from rendering the first view to rendering the second view while maintaining the cursor at the same position relative to the edge of the rendered view, such that the cursor remains substantially stationary on the rendering device.

20. The system of claim 19, wherein both the first view and the second view are third person views of the game space.

* * * * *